US012717608B1

(12) United States Patent
Liebana et al.

(10) Patent No.: US 12,717,608 B1
(45) Date of Patent: Aug. 25, 2026

(54) PROGRAMMATIC FUNCTIONAL DEPLOYMENT OF SERVICES IN NETWORKED ENVIRONMENTS

(71) Applicant: Amazon Technologies, Inc., Reno, NV (US)

(72) Inventors: Francisco Lopez Liebana, Sunnyvale, CA (US); Ankur Sharma, Bellevue, WA (US); Vivek Neppalli, Bellevue, WA (US); Jianang Wang, Renton, WA (US); Yinzhi Xi, Cupertino, CA (US); Kaspar Franz Poland, Ft. Collins, CO (US); Robin Alan Golden, Los Gatos, CA (US)

(73) Assignee: Amazon Technologies, Inc., Reno, NV (US)

( * ) Notice: Subject to any disclaimer, the term of this patent is extended or adjusted under 35 U.S.C. 154(b) by 93 days.

(21) Appl. No.: 18/733,320

(22) Filed: Jun. 4, 2024

(51) Int. Cl.

| | |
|---|---|
| ***G06F 9/455*** | (2018.01) |
| ***G06F 8/71*** | (2018.01) |
| ***H04L 67/10*** | (2022.01) |

(52) U.S. Cl.
CPC ............ *G06F 9/45558* (2013.01); *G06F 8/71* (2013.01); *H04L 67/10* (2013.01); *G06F 2009/45587* (2013.01); *G06F 2009/45591* (2013.01); *G06F 2009/45595* (2013.01)

(58) Field of Classification Search
CPC ......... G06F 9/45558; G06F 8/71; H04L 67/10
See application file for complete search history.

(56) References Cited

U.S. PATENT DOCUMENTS

| | | | |
|---|---|---|---|
| 12,192,067 B2 * | 1/2025 | Nassar | H04L 41/22 |
| 2007/0150480 A1 * | 6/2007 | Hwang | G06Q 50/60 |

* cited by examiner

*Primary Examiner* — Nazia Naoreen
(74) *Attorney, Agent, or Firm* — Hogan Lovells Cadawalder US LLP

(57) ABSTRACT

Approaches are disclosed for building and deployment of services in a multi-tenant resource environment. In particular, various approaches allow for the use of a library of building blocks to build and customize new services, including micro-services that are built to perform a specific task for one or more other services. Each building block serves as a template to build and customize a new service, providing the code, infrastructure, and default configuration for the service so the vendor deploying the service can focus on customizing the service based on relevant business logic. Such an approach allows for generation and configuration of services through programmatic functional deployment at a higher level of abstraction that deployment of, for example, infrastructure as code.

20 Claims, 10 Drawing Sheets

Building Block Pipeline

PROGRAMMATIC FUNCTIONAL DEPLOYMENT OF SERVICES IN NETWORKED ENVIRONMENTS

BACKGROUND

As an increasing amount of functionality is being provided using networked resource capacity, or "cloud" resources, there is a corresponding increase in the complexity of properly allocating, configuring, and managing these resources. In many instances, a single cloud-hosted application may leverage several cloud-based services provided using these resources. The services may handle tasks such as creating new database instances or managing serverless work functions. Unfortunately, building and configurating these services for use by the application typically requires not only understanding the complexities and details of the application, but also specific details of the networked resources that are to provide those services. There is currently no way to automate the creation and configuration of these services, including the infrastructure needed to host these services and allow them to communicate and work together seamlessly.

BRIEF DESCRIPTION OF THE DRAWINGS

Various embodiments in accordance with the present disclosure will be described with reference to the drawings, in which.

DETAILED DESCRIPTION

Figure 1:
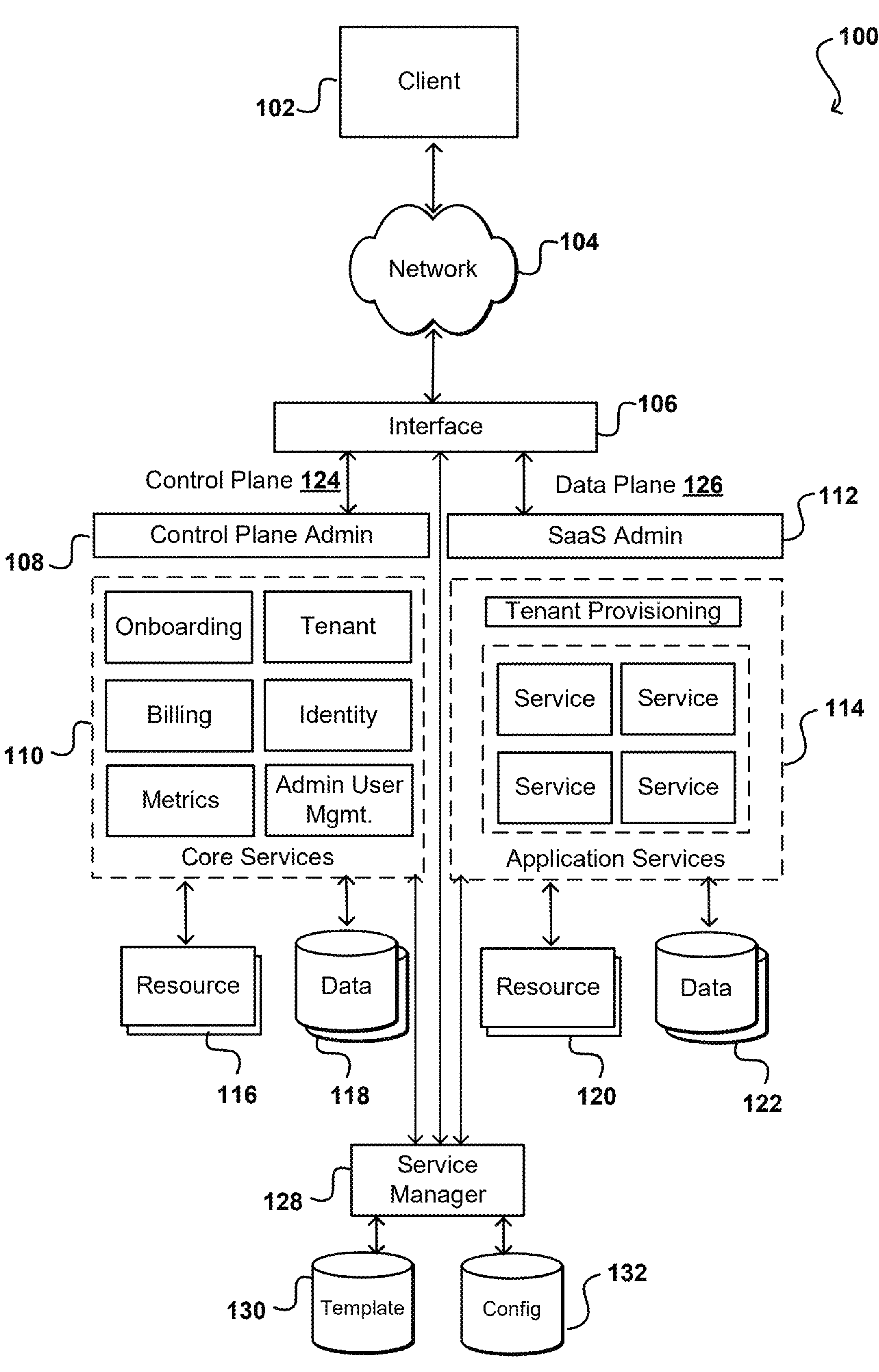
FIG. 1 illustrates an example system to perform a functional deployment of services, in accordance with various embodiments.

Approaches disclosed and suggested herein relate to the building, deployment, and interaction of services in a multi-tenant environment. In particular, various approaches presented herein allow for the use of a library of building blocks to build and customize new services, including micro-services that are built to perform a specific task for one or more other services. Each building block can serve as a template that can be used to build and customize a new service. A building block can include the code, infrastructure, and default configuration to allow a service to be built and deployed so that the user, customer, or other entity (referred to herein as a vendor) generating the service can focus on customizing the service based on relevant business logic. A building block can allow a service to be built that works with available resources, and can communicate and work with other services built using other building blocks. Such an approach allows for generation and configuration of services through programmatic functional deployment at a higher level of abstraction that deployment of, for example, infrastructure as code. One or more service teams (or building block teams) can generate appropriate building blocks, and vendors can deploy a set of services with associated microservices by selecting and customizing the appropriate building blocks, without having to worry about aspect of the control plane or resource environment for which they will be deployed. A service instance can include the code and infrastructure from the selected building block, packaged and/or merged with customized configuration, where the packages can also be region independent. The services can be configured to have dependencies or work together to perform specific tasks, but the actual code and communication protocols can be provided via the relevant building block template. A vendor can thus build one or more services that utilize a set of microservices to perform specific tasks, but all the underlying complexity has been abstracted away such that the vendor is primarily tasked with customizing the services for the specific purpose for which the services are being deployed. The vendor can also specify the number of instances and places for deployment (e.g., different geographic regions) and the service management application or service can handle the deployment, with the services already designed (through the underlying building blocks) to work seamlessly with such a deployment.

An approach in accordance with at least one embodiment can allow vendors to configure building block-based applications, as may be provided through a vendor development kit (VDK), service management application, or other such offering. Interfaces with vendors can be defined for specific building blocks that also allows for automations of complex configurations, as may relate to cross-building block dependencies. Features and additional building blocks can be added for vendors as needed, while removing complexity and promoting best practices, as may relate to grouping, naming conventions, and the like. When a new vendor onboards, that vendor can be provided with a pre-generated package that contains a default starter kit, allowing the vendor to perform tasks such as to add new building blocks, cells, and configuration.

In the following description, various embodiments will be described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

FIG. 1 illustrates an example network deployment 100 that can be used to support applications deployed in a resource provider environment. This may include, for example, the deployment of one or more applications as software as a service (SaaS) applications, hosted by one or more physical and/or virtual cloud resources offered through such an environment. A user (e.g., a customer having an account with the resource provider) can use a client device 102 to submit requests across at least one network 104, such as a cellular network or the Internet. The request can be received to an interface (e.g., an API) of an interface layer, then directed to the appropriate recipient, such as a control plane administrative layer 108 or a SaaS administrative layer 112, among other such options. The user may need to set up and configure various resources to support the application, as well as various services that can be leveraged by the application. In this example, the SaaS architecture (or resource provider environment) is comprised of two distinct layers, including a control plane 124 on the left and a data plane 126 on the right. The control plane 124 is used with a multi-tenant SaaS solution, providing the ability to manage and operate various tenants through a single, unified experience. The control plane can include a collection of "core" services 110 that are used to orchestrate the multi-tenant experience, including services relating to onboarding, tenant management, billing, identity management, metrics calculation and monitoring, and administrative user management. It should be understood that the selection of core services can vary between embodiments or implementations, and may include core services other than those illustrated. A separate SaaS administration application 112 is illustrated, which can be used by a SaaS provider (or other such entity) to administer a set of application services 114 for a given SaaS implementation. The application can use various resources 120 and repositories provided by the multi-tenant environment to provide these services.

It can be noted that the control plane 124 and its core services 110 will often not actually be multi-tenant. This functionality typically will not provide the actual functional attributes of a SaaS application, which may need to be multi-tenant. In this example, there is no tenant isolation inside any of the core services 110, nor any other constructs that might be part of the multi-tenant application functionality. These core services 110 can be global to all tenants of the multi-tenant environment, On the right side (in FIG. 1) is the application or "data" plane 126 of an example service-based environment. The data plane 126 is where the multi-tenant functionality of a SaaS (or other cloud resource-hosted) application can reside. Various services can be provided through the data plane, where individual solutions can be deployed and decomposed differently based on the needs of the particular domain, technology footprint, and so on. The application domain can be separated into at least two elements. An application can represent the tenant experience and/or application for a given solution, representing the surface that tenants touch to interact with the application. There are also various backend services that represent business logic and functional elements of a service-based solution, which may correspond to various microservices, or some other packaging of various application services. These can also represent tenant provisioning functionality, as any provisioning of resources for tenants during onboarding could also be part of this application domain, although tenant provisioning can also occur in the core services 110 of the control plane. Tenant provisioning may be considered part of the data plane as the relevant resources to be provisioned and configured are more directly connected to services that are created and configured in the application plane.

As mentioned, it can be difficult and time consuming to deploy the appropriate services and microservices to support these multi-tenant applications. In addition to the expertise needed with respect to the resource provider environment, there are also complexities and requirements of the various applications and multi-tenant deployments. Today, a service team that intends to create a microservice, or a full service with advanced microservices, may need to deal with every single microservice independently. This includes building, configuring, troubleshooting, bootstrapping, and other such tasks needed to get those microservices up and running as expected. The microservices also need to be able to communicate with, and understand, the other relevant microservices. Such a process can be very costly, at least in terms of time and resource demand.

Accordingly, approaches in accordance with various embodiments can provide the ability to build and configure new services, such as control plane services, using a set of building blocks associated with specific services, or microservices. A building block can include the code needed for a specific service, such as may perform a specific task or function associated with the control plane 124. Each building block can also represent a single tenant instance of functionality, which can be highly customized by applications providers or members of the control plane service team, among other such authorized service team personnel, collectively referred to herein as "vendors." These building blocks can allow a small team to create services, such as control plane services needed to support an application or multi-tenant offering, while focusing on the actual business logic. Core tasks such as creating a new database, porting a software engine, or managing serverless functions can each be managed using respective building blocks, which abstract away the complexity of creating and configuring those services, as well as the complexity of deploying and maintaining the corresponding infrastructure. Such an offering allows for the self-configuration and defining of entire new services, and/or connected microservices, using one or more customizable building blocks. These building blocks provide more than just infrastructure as code, but allow for defining of full microservices and control plane services as code.

A service manager 128 application or service, for example, can provide the relevant interfaces and logic to allow a vendor to select and customize building blocks in order to deploy new services, or modify existing services. As mentioned, there may be many different building blocks (or service templates) stored to a template repository 130, building block library, or other such location. The service manager 128 can allow a vendor to select a building block, and customize the configuration based on business logic or intent for the service, and can store that customized configuration (at least temporarily) to a configuration repository 132 or cache. The customized configuration can then be packaged together with the code, infrastructure, and other information in the selected building block and deployed to the relevant location, such as to a resource 116 allocated to provide one or more control plane services. Configuration data and other such information can also be stored to at least one data repository 118.

In at least one embodiment, building blocks can be used to build single tenant microservices. As an example, a building block might provide the ability to use and/or access a database service, such as DynamoDB from Amazon Web Services, Inc. For every vendor who wants to offer access to tables in the database service, the database service may need to spin up a full new service rather than create a table inside of the database service itself. The database service also has to handle tasks such as customer isolation. One or more building blocks can be used to provide this functionality, and a copy of the relevant building blocks can be deployed for each vendor in every region and for every cell for which such a table is to be created. One or more building blocks can be used to perform tasks such as to deploy, configure, manage, update, and provide access to various services or microservices. Rather than deploying and configuring each microservice independently, such an approach can ensure that microservices are configured consistently and able to interact with each other as needed. Such consistency can be guaranteed regardless of different deployment times, versions, compatibilities, and so on.

A building block can take the form of a software development kit (SDK) packet. The packet can contain code and information defining the appropriate infrastructure, among other such information useful for building and/or customizing a service. An example building block is a telemetry building block that exposes an application programming interface (API) for vendors and resource to submit requests for various metrics to be collected. The building block can define a service that allows those metrics to be identified, collected, and propagated in an appropriate way to one or more target recipients. For such telemetry operations, it can be important to protect the metrics and related operations against bad actors or unapproved usage. A telemetry building block provides the ability for a vendor or other service customer to configure and apply the appropriate protection, such as to ensure that a bad actor with access in the data plane cannot modify or impact the metrics, such as by posing as a different customer. The building block can allow for other tasks to be performed as well, as may relate to aggregation or sharding of at last some of those metrics. The telemetry operations can be provided by a small service with a single purpose, as defined by the telemetry building block. The service can be tasked to run the API layer on data streams, for example, to collect and temporarily store the relevant metrics and then stream the metrics out as configured. This SDK packet can be predefined, including the necessary code, configuration, and other information needed for a specific service, or microservice. A default configuration can be provided in the packet data, including at least some parameters that can be modified to customize the service. This may include, for example, specifying the metrics to collect, the streams on which to collect the metrics, and one or more recipients to receive the collected metrics, among other potential customizations. Customers can be allows to concurrently configure and deploy various microservices from a single interface or application, by selecting and customizing the appropriate building blocks. Where there are dependencies, a management application can ensure that the microservices are deployed in the correct order according to those dependencies. In at least one embodiment, a single overarching service can be configured and deployed that has several related microservices, at least a portion of which are defined, configured, and customized using relevant building blocks.

Figure 2:
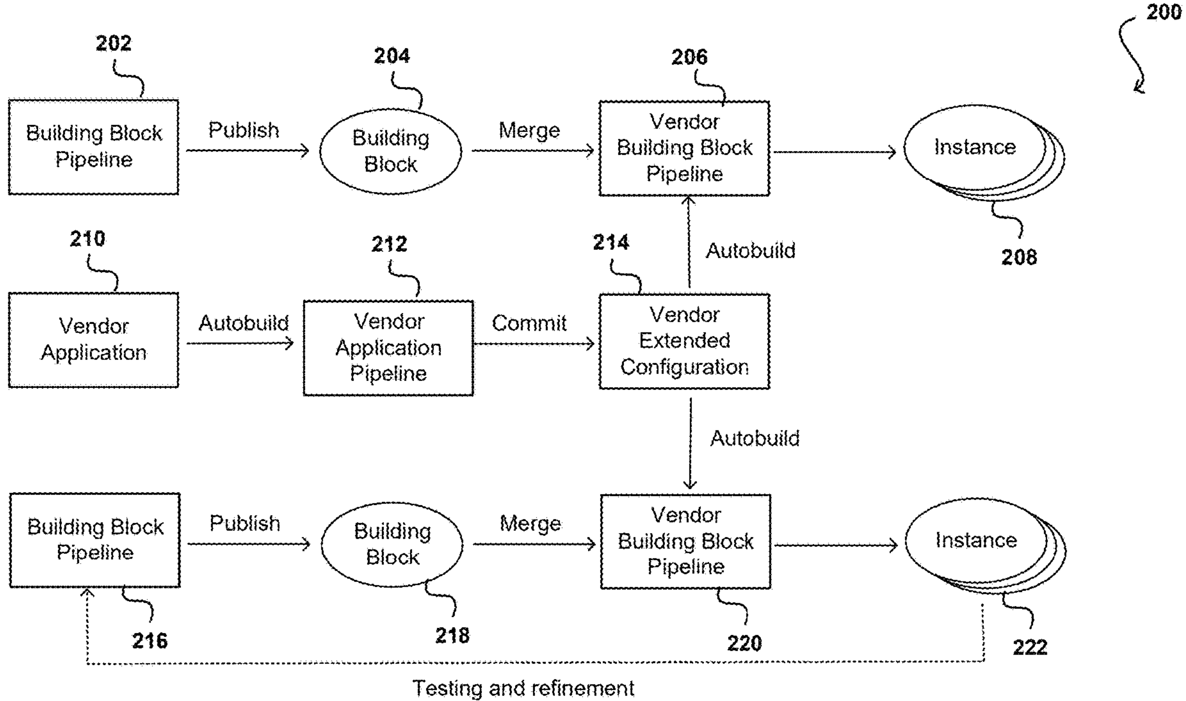
FIG. 2 illustrates pipelines that can be used to generate instances of services (including microservices) in accordance with various embodiments.

FIG. 2 illustrates an example pipeline-based implementation 200 according to at least one embodiment. Such an implementation 200 can allow a vendor application 210, for example, to be able to build and configure new services, or microservices using corresponding building blocks. In this example, a building block pipeline 202, 216 can be used by a building block team (or service team, etc.) to generate a building block 204, 218 for a specific service or microservice. In this example, there can be different building block pipelines 202, 216 used for different vendors. Once these pipelines are built, one or more instances 208, 222 of a service can be built and configured using the corresponding building blocks 204, 218. The building block pipeline 202 can be used by a service team to define the infrastructure to be used for a specific service (or microservice), and provide the code to be executed to provide that service.

A separate vendor building block pipeline 206, 220 can be used for each vendor in this example. A vendor building block pipeline 206, 220 can ensure that a service provided by a building block functions as expected. A vendor can also have a vendor application pipeline 212 that can be used to define one or more aspects of a vendor application 210. The vendor application 210 can specify that a vendor building block is to be used to provide a service. The building block will typically require at least some configuration to be applied that is specific to the vendor application 210. The configuration data might include, for example, identifying information for users or processes that are allowed to call the service using the vendor application 210, as well as service-specific configuration such as the metrics that are to be collected for a telemetry service, the number of customers expected to be listening to the metrics, and so on. The vendor application pipeline 212 can generate the vendor extended configuration for the building block as specified by, or otherwise determined to be appropriate for, the vendor application 210. The vendor extended configuration 214 can be provided with the respective building block 204, 218 to the appropriate vendor building block pipeline 206, 220, which can build, configure, and test the configured building block, and deploy the service for the vendor if the configured building block is determined to work as expected.

For example, a vendor building block pipeline 220 can take the definition of a service from the building block 218 and can start building the foundation for the respective service, which is to be instantiated with the specified vendor extended configuration. If necessary, the vendor building block pipeline 220 can create an account where this copy of the building block 218 can be deployed, and can add the appropriate permissions. The vendor building block pipeline can configure the appropriate resource(s) so that resources or information can be deployed for the account. The vendor building block pipeline can also establish principals and perform other appropriate tasks to make sure the account is ready for use. The vendor extended configuration 214 can then be written to the packet for the building block, along with any other appropriate configuration information for resources created using the vendor application pipeline 212. This configuration data can be written to the packet, which is auto-built in this example, and then deployed as one or more instances 222. As mentioned, the ability to use building blocks to define a service allows a vendor to focus on customizing the service according to the relevant business logic, instead of defining an entire pipeline at build time specifying the configuration for all services to be deployed.

As mentioned, a building block pipeline 202, 216 can allow a building block team to build one or more building blocks 204, 218. Each building block can be set to work with a specified default, naive configuration. In at least one embodiment the building blocks may be published to a building block management service, which may be shared across multiple vendor pipelines. A new building block may need to pass one or more quality checks before being published to, or available from, a building block service. As mentioned, there may be one vendor building block pipeline per vendor and per building block. If a given vendor is using two separate services based on two separate building blocks, then that vendor will have two vendor building block pipelines 206, 220 that may provide these services for the same vendor application 210. The vendor extended configuration may significantly change the shape of the service, such as to create additional or alternative infrastructure, including different content in the respective account. The configurations from the various vendor will not be stored into a single bucket or repository, as those configurations may be incompatible or may potentially break each other. It can therefore be beneficial to have one pipeline per vendor and per building block to avoid configuration issues between different vendors and instances. The specific vendor building block pipeline 206, 220 can take the respective building blocks 204, 218 from the building block service and merge the included source code with the vendor extended configuration 214. The merging can occur near the end of the building process so that the entire customized and/or extended configuration is included and can be tested, as may relate to all the cells and information needed to deploy the service, including regions in which cells are to be deployed, cell names and identifiers, and the line. A final commit can then be performed that includes all appropriate changes.

Figure 3A:
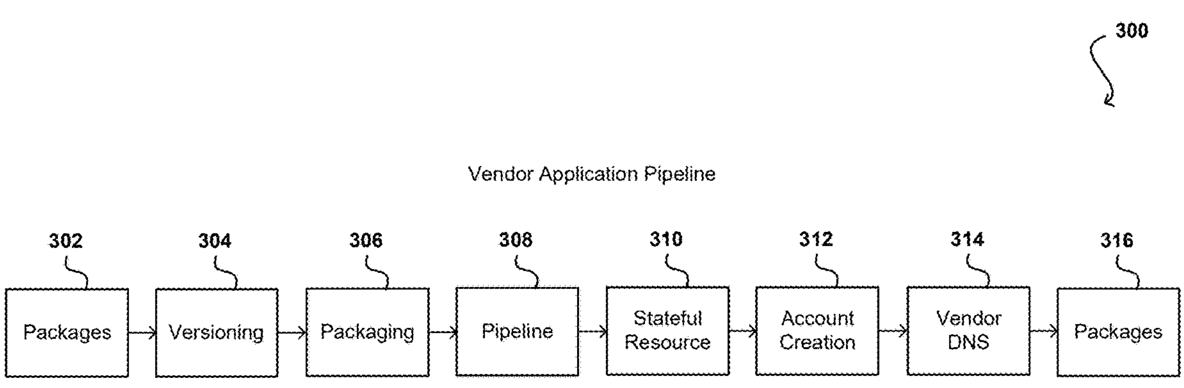
FIGS. 3A, 3B, and 3C illustrate example components of a vendor application pipeline, vendor building block pipeline, and building block pipeline, respectively, in accordance with various embodiments.

FIG. 3A illustrates components of an example vendor application pipeline 300 that can be used in accordance with at least one embodiment. A vendor application pipeline (VAP) is a pipeline that can that help to automate tasks such as cell creation, automation, and configuration for all building blocks. In at least one embodiment, aspects of a deployment can be managed using a library, which enables changes or updates to be released to that library as needed. The vendor can obtain an instance of one or more building blocks as one or more packages 302, and these instances are then owned and/or managed by the vendor. As mentioned, each building block may define an entire new service or a microservice that performs a specific task relating to an existing service, among other such options. Each vendor may also have its own vendor platform pipeline 300 to perform such tasks.

A vendor application pipeline 300 can be used to set up the foundational resources and pre-configure the respective building blocks. The vendor application pipeline 300 can help to perform various tasks, such as to provide specific instructions for users of a building block pipeline, as may be based in part upon the implementation selected by the vendor. This may include tasks such as identifying packages 302 or building blocks, performing versioning 304 and packaging 306, and configuring the respective building block pipeline 308 and associated resources 310. The vendor application pipeline 300 can validate that the vendor application is correct, and will not introduce disruptive changes such as existing cell suspensions and renaming resources, among others. A vendor application pipeline 300 can create 312 the accounts required per the vendor application instructions, and can add the necessary roles to these accounts. This can include building block interdependency roles that would require deployment synchronicity or make deployments to fail. A vendor application pipeline 300 can bootstrap accounts using a serverless function that can be used to automate such tasks. A vendor application pipeline 300 can deploy vendor DNS 314 higher levels to the appropriate accounts, such as by using a serverless function that creates the hosted zones in the recently created accounts and roles. The vendor application pipeline 300 can also write an extended configuration to the appropriate packages 316, where the extended configuration contains the final values for all building blocks to be deployed in a single run, with no failures and all dependencies cleared out. Such a pipeline can process all vendor configuration changes, even though the pipeline may not understand anything about the building blocks themselves, nut only knows about foundational resource requirements such as accounts and roles, and can follow the vendor application instructions. A vendor application pipeline 300 can also support other automation improvements and global resources, and can be used to implement observability features.

A file or package can be produced by a vendor application pipeline 300 that has the required configuration for all building blocks, along with the roles and appropriate DNS values to be used for deployment of the corresponding service. There will generally be no manual intervention needed in such a process, except for potentially the propagation of this configuration from the database location where it was written to the actual package that is in an auto-build for all the vendor building block pipelines for a given vendor. That configuration can be promoted using a basic command that helps to avoid mistakes.

Figure 3B:
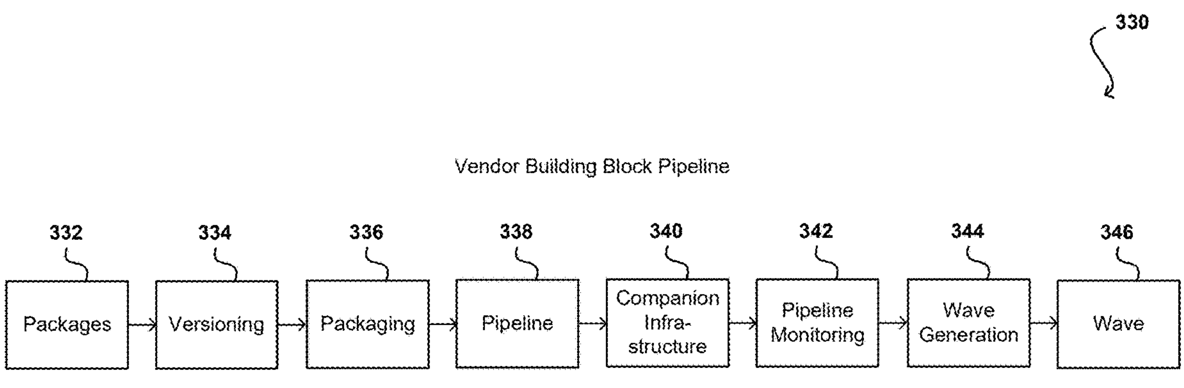

FIG. 3B illustrates an example vendor building block pipeline 330 according to at least one embodiment. A vendor building block pipeline 330 can be used to execute the deployment of a building block to the cells defined by a given vendor. There can thus be one vendor building block pipeline 330 per vendor and building block. A vendor building block pipeline 330 can be used to tie vendor and platform configurations with building block artifacts to form a building block instance, or building block cell. Such functionality is possible because all building blocks can be constrained to use a specific construct to define how to deploy their cells and companion infrastructure, which is to be used in this pipeline to create the instances from the extended configuration related to the building block being deployed through the pipeline.

In this example, the vendor building block pipeline 330 obtains the relevant packages 332, and performs versioning 334, packaging 336, and pipeline configuration 338 as discussed previously. This can include tasks such as reading the vendor extended configuration and, depending in part on the building block that the pipeline is deploying, and fetching the appropriate building block creation instance. The pipeline can also pass the building block final configuration that can contain information such as the cell information, vendor provided configuration, and provided configuration. The vendor building block pipeline 330 can consume the latest artifacts from building block and/or building block service, and can organize all the building block cells into waves 344. In this example, a companion infrastructure task 340 can be executed to deploy any extra resource to the pre-defined companion accounts for the corresponding building blocks. A pipeline monitoring task 342 can also be performed that creates all the monitoring resources to monitor and trigger alarms as appropriate for a given vendor building block. A wave generation 344 task can then be performed to deploy each of the building block cells in a predefined order, including performance of sub-tasks such as integration and/or canary testing, identification of promotion blockers, and the like. A specific version of a building block can be deployed for a vendor using such a vendor building block pipeline 330, but there may be aspects of the building block that are not yet determined, but as mentioned can be determined using a building block pipeline.

Figure 3C:
Figure 3C:
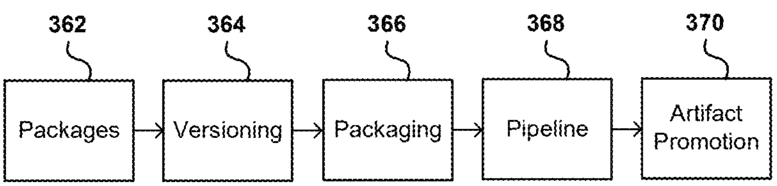

FIG. 3C illustrates an example building block pipeline 360 in accordance with at least one embodiment. A building block pipeline 360 can allow building block and/or service teams to develop their software and services. A building block pipeline 360 can be used to build the appropriate artifacts and create the first instances of a building block, where the building block team can test and makes sure the service being built operates as expected. A building block pipeline 360 can behave similarly to a vendor building block pipeline, including steps such as identifying packages 362, performing versioning 364 and packaging 366, and configuring the appropriate pipeline 368. At least one different task can be performed, such as to promote 370 to a building block service the building block artifacts that are required for a given building block instance to run and be tested.

Figure 4:
FIG. 4 illustrates an example versioning process, in accordance with various embodiments.
Figure 4:
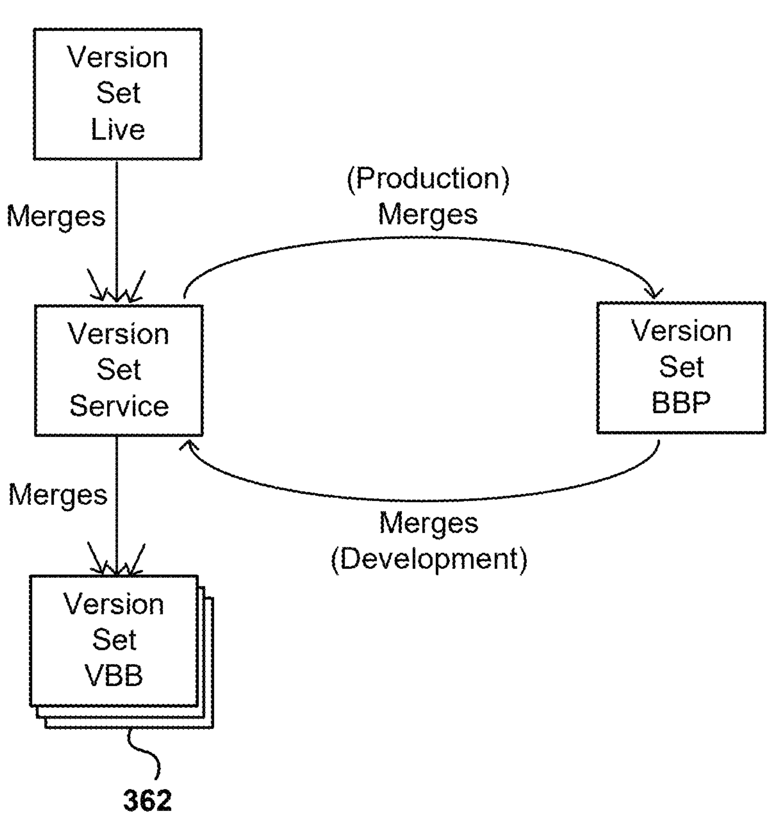

FIG. 4 illustrates an example approach 400 to releasing changes (or otherwise updating or deploying versions) produced in one pipeline but consumed by multiple pipelines. Such an approach can be implemented using a building block service or other such mechanism. A building block service can include a version set that compounds dependencies along with the builds of the artifacts generated by a building block. There may be one such version set per building block. In at least one embodiment, any new changes from any first party dependency can be merged via the building block service. Any first party dependency changes for building blocks can come from a specific version set, and can also be merged into the appropriate building block pipelines and vendor building block pipelines. Any internal dependencies or artifacts built, generated, and/or created through the building block pipeline can be published to be available to the relevant vendor building blocks.

Various embodiments can also provide for the accelerating of building block development. In at least one embodiment there may be at least one initial template that a building block team uses as a starting point for a new building block. Such a template can include basic code and infrastructure detail, fixes, best practices, and other such features. One example template includes a building block that implements the interfaces needed to be automatically deployed to cells. The template may also specify a virtual private cloud (VPC) or other such layer, with best practices and routing information protocol (RIP) integration to be deployed by default to any deployments, as may occur in different geographical regions. A template might provide for DNS name selection and integration, and can specify a set of compute instances to be used for tasks such as to deploy relevant services and processes. A template may also specify a service that can be able to interact with load balancers and other such traffic routing components. A template can specify configuration best practices, and can provide relevant testing infrastructure.

As mentioned, such approaches can be used with various cells into which a control plane and/or data plane can be expanded. A new data cell can be defined, which can involve logic beyond the actual building blocks that have been created and configured. As mentioned, the building blocks can work with other building blocks, and the vendor code and permissions of the various building blocks can be leveraged within a given cell. There may additional building blocks added to a cell, as may be built and configured or otherwise obtained, such as through a building block marketplace where many teams can build and offer their own building blocks. Building blocks can be added as needed, which can be configured to work with the other building blocks. A template that can be used by an appropriate pipeline to perform the actual deployment. A building block service can execute an appropriate workflow to take the template and execute the instructions provided by that template. A given template can define all the building blocks that are to be created for a given service, as well as the cells that are to be composed of building blocks, the necessary resources, the accounts to be created, the necessary permissions, and data for accounts to be used or crated, among other such options. Once completed, the building block can then be deployed and executed. The building block data, extended configuration, and other relevant information can be merged as a new template for resources to be created. The extended configuration can include all relevant information, as may include information for the cells and the infrastructure needed to deploy the service. The configuration may also include information identifying the cells to be used, regions in which the cells are to be deployed, the cell names or identifiers, the appropriate DNS configuration, and other such information. After the extended configuration is obtained, a new commit can be performed that contains all the changes that need to happen, then the building blocks can be deployed. The configuration can also be merged with other metadata including relevant instructions or detail as appropriate. In at least one embodiment, code can be used to merge the configuration information with constructs, and a copy of the building block generated for each instance to be defined. As many instances or copies of a given building block can be generated as appropriate. A single template may be generated that is instantiated for each region and used to compose building blocks, with the constructs and infrastructure able to be defined in a way that is region-independent.

Figure 5:
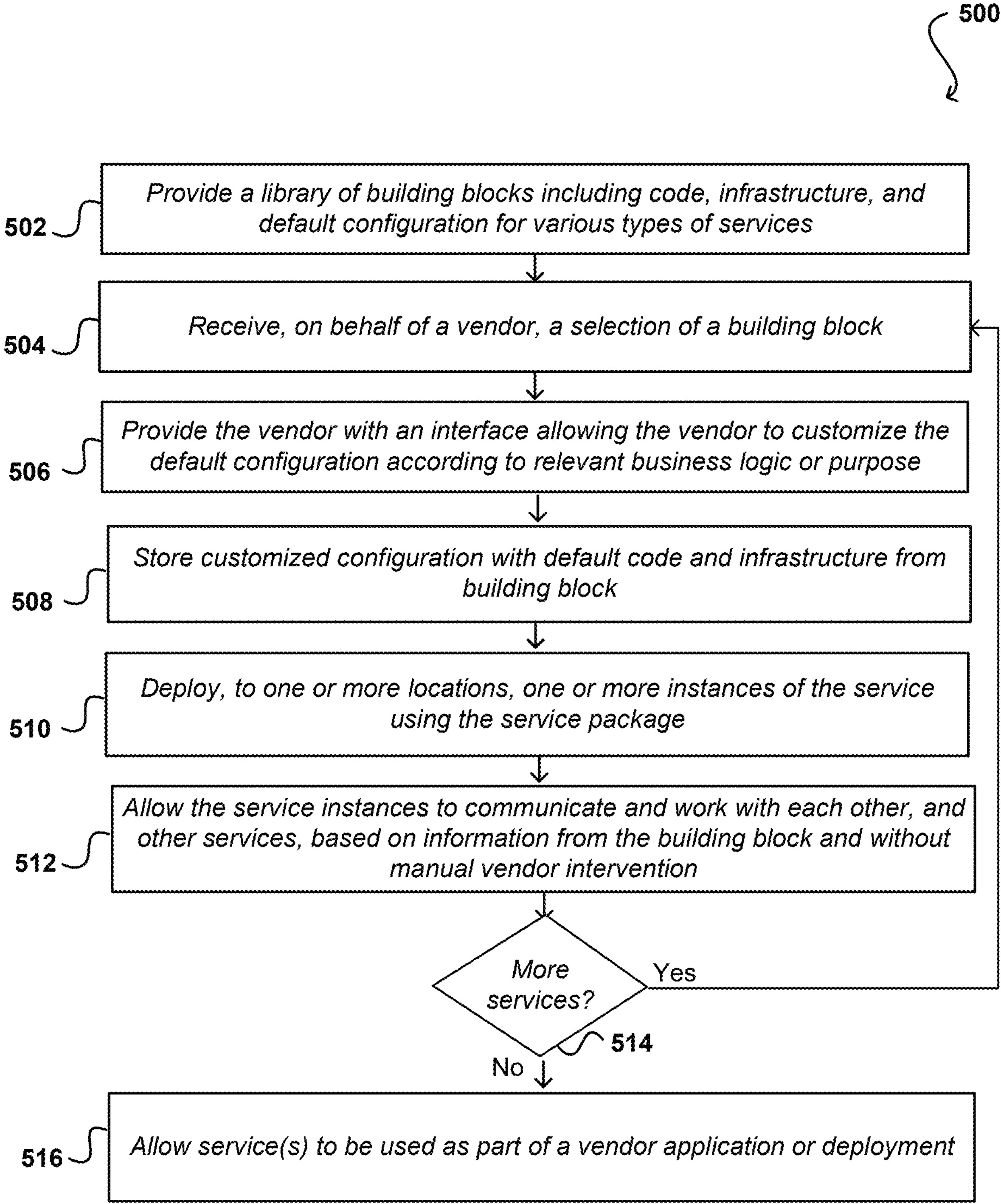
FIG. 5 illustrates an example process that can be performed to generate one or more services using a building block that includes code, infrastructure, and customizable configuration, in accordance with various embodiments.

FIG. 5 illustrates an example process 500 that can be performed to build and deploy services by customizing one or more service building blocks in accordance with at least one embodiment. It should be understood for this and other processes discussed and suggested herein that there can be additional, fewer, or alternative steps performed in similar or alternative orders, or at least partially in parallel, within the scope of the various embodiments unless otherwise specifically stated. Further, although discussed with respect to building blocks and services, approaches to providing programmatic functional deployment can be used advantageously in other types of networked and/or multi-tenant environments as well, within the scope of various embodiments. In this example, a library of building blocks can be provided 502, where the individual building blocks can include the code, infrastructure, and default configuration for specific types of services, and also allow such services to communicate and work together once deployed. A selection of a building block can be received 504 on behalf of a vendor. As mentioned, there may be specific building blocks provided to perform specific tasks, or sets of tasks, and a vendor can select the appropriate building block given on the type of task to be performed. In at least one embodiment, a vendor can be provided with guidance on the building block(s) needed for a type of service, including related microservices.

The vendor can be provided 506 with an interface that allows the vendor (or another authorized party, entity, or process) to customize the default configuration. The customization can be based upon business logic or service purpose, for example, and does not need to involve any core functionality relating to performance of the service itself. For example, the customization can relate to authorized users, specific addresses or data to be used, and the like. The customized configuration can be stored 508 with the default code and infrastructure from the building block into a deployable service package. As mentioned, this can include storing the configuration with the default code and infrastructure in an individual package, or the configuration can be stored separately and then merged with the default code and infrastructure just before deployment, in order to ensure the most recent versions of the code and infrastructure are included. One or more instances of the service can then be deployed 510 using the service package. These instances can be deployed to different regions or for different user groups, among other such options. The deployed service instances can be allowed 512 to communicate and work with each other, as well as with other such services, based on information that was contained in the building block, without manual intervention needed on behalf of the vendor (other than was provided through the configuration customization). It can be determined 514 whether there are more services to be built and deployed, and if so then the process can continue with the next service. If it is determined 514 that there are no more services to be deployed (at least at the current time) then the building and deployment of services can be stopped or paused, and the services can be allowed 516 to be used as part of a vendor application or deployment, including microservices that support higher level services in the control plane or otherwise. As mentioned, rather than multiple interactions with multiple teams during service creation and deployment, a single team can be able to provide customized configuration data up front, and the service can handle tasks such as deployment, provisioning, configuration, and the like without further manual intervention. Such an approach can not only improve the overall process by avoiding configuration, communication, and other errors or differences between services, but the ease of creation and deployment, as well as the ability to enact deployments at higher levels that include many different services, can improve the value to users and make those users more likely to adopt and use these services. Further, because this provides such a low level primitive of providing software deployment, such an approach is not only beneficial for external users, but internal users as well, such as may be associated with a provider of the resources or services themselves. This can be beneficial for building block team users as well, who can deploy and test their own building blocks using such an approach. Such an approach can allow for testing and refinement of building block by such teams, as illustrated in FIG. 2.

As mentioned, such a process has an advantage of allowing programmatic functional deployment to be performed at a relatively high level of abstraction. This deployment can be relatively independent of control plane or service application aspects, and can use a set of building block templates that allow specific services to be deployed that can already communicate and utilize available resources, without any need for knowledge about those aspects on the part of the vendor. Vendors can build and connect services to perform specific business tasks, for example, without needing to know or manage any of the underlying code or infrastructure needed for the services. Further, the building blocks can provide default configuration so that the services can operate to perform their intended tasks, allowing a vendor to focus on any customization that is identified as appropriate. Each building block is essentially a definition of a type of service that can be used by vendors or other such persons or entities to build and deploy those types of services. The vendor does not need to perform tasks such as to spin up a server, load a server with code, cause the code to execute, etc. The deployment, permissions, communication and request routing, and other such aspects are handled automatically using the information in the building blocks as well as the deployment pipelines and management service. Various approaches can allow building block developers to create building blocks and verify that the created blocks are working properly. Vendors can be allowed to prepare the appropriate configuration and build the foundational resources for various building blocks. These approaches also allow authorized users to leverage both functionalities, such as by deploying building blocks to their target destinations with the appropriate vendor configuration and foundational resources in place. Various approaches can provide a framework that encapsulates infrastructure as code, service-specific code, and default configuration to be deployed as a single tenant block. Such approaches can enhance and allow teams to quickly develop single tenant microservices by focusing on the business logic without having to deal with region build and the foundational resources needed to make a service work securely. Such an approach can allow for building services, such as control plane services that can be used to manage a fleet of resources for users, such as customers of a resource provider environment, without a service provider having to worry about, or even be aware of, various complexities and details that need to be considered. Each building block can be a single tenant package of functionality that can be highly customizable by vendors or other appropriate entities, parties, or processes. Such a process can provide for self-configuration by a service management system or other such deployment. Such an approach can also allow for updating of the services as needed, without a need for a vendor to continually rebuild or re-bootstrap services over time.

Further, such an approach can reduce the amount of effort needed to manage security and other such functions. In some deployments, there may be multiple services that work together and/or leverage the same other services. If there is a security concern with one of these services in prior systems, the security concern may need to be addressed separately for each respective service, which can be expensive and time-consuming, and may result in inconsistent handling. Using an approach in accordance with at least one embodiment, the appropriate building block can be identified and updated to address the security concern, and then deployed. Any other services leveraging that building block can then essentially get the security update for free without having to perform any additional investigating or remediation.

In at least some implementations where there may be a large numbers of vendors, for example, there may also be a large number of vendor pipelines and vendor-specific services and cells. A change in configuration or building block artifacts can trigger a new deployment for each impacted service, which can require passing through the appropriate pipeline for each such deployment. Due to the length of time needed to pass through a given pipeline, this may take a substantial amount of time to complete. Approaches in accordance with at least some embodiments can instead maintain the building block artifacts separate from the extended vendor configuration, rather than maintaining them in separate packages for each vendor service. A management service can be used that maintains this data separately, and then allows them to be dynamically merged at deployment time, which can be significantly faster and can avoid the need for each update to go through a deployment pipeline for each impacted service. Such an approach can also significantly reduce the amount of effort needed by a building block team to manage many individual vendor building block pipelines. An update to a building block can be published to the relevant building block library, which can be merged and deployed to the impacted instances from this single location. Such an approach can also help to automate rollout of a new version of a building block or service.

Such a service can also be used to implement hooks into the various deployment pipelines. It may be the case that it is desired to expand functionality at a specific point in a pipeline. Software hooks can be inserted at various points to allow for calls, such as API calls, to obtain additional functionality at the relevant location in the process. Being able to implement functionality for multiple vendors from a single location provides advantages, such as the ability to use historical data to make determinations as to whether to allow a specific operation to be performed for a vendor pipeline, cell, or service. Such a service can help to provide full self-onboarding, self-configuration, and control to the various vendors using building blocks to deploy their services.

A management service in accordance with at least one embodiment can address various operational, scaling, and automation challenges experienced with the use of multiple separate pipelines for various vendors, as well as the need to package the building block artifacts and vendor extended configuration for each vendor customized service. An example of an operational challenge is that a building block with a failed merge in its version set might need an operator to implement a fix across dozens of vendor building block pipelines. Occasionally building blocks will introduce breaking changes that need an operator to log into the account and delete some resources. A building block operation would need to do this at least dozens, if not hundreds, of time, given that many cells may be deployed at once in the first stage for speed or other such reasons. In some instances, there may be a need to track software releases that depend on each other, which can be challenging when using separate pipelines and packages. If a building block needs to release a series of consecutive changes that need to be deployed separately and contiguously, the building block team would need to wait for each change to be deployed to all cells, which could take months and be difficult to track correctly, increasing the risk of downtime and more operational work. Further, rolling back changes in a building block can be risky. In some embodiments, vendor changes and building block changes are part of the same deployment path, and reverting a building block change could revert a critical configuration change for a vendor.

There are other challenges to improving automation as well. For example, adding new cells blocks can require operator intervention, and vendors may add new cells on a daily basis. This could result in a significant number of interventions per day. Vendors may not have the ability to roll back a bad configuration deployment by themselves. If the deployment occurs late in the pipeline, vendors may either wait days for it to be fixed or request a manual intervention from building block operators. A vendor may not be able to configure their management application or service automatically using their resource information directly from their pipelines and related information, which can cause issues when vendors try to create or update new configurations, triggering non-actionable service calls for building block developers. Further, vendors may be unable to control the deployment of how their management application changes flow to cells. The vendor application pipeline may not deploy to cells, but instead triggers deployment through the vendor building block pipelines, which vendors may have no control over. If vendors need an intervention, such as to stop a configuration deployment, the vendor may need to engage management system operators, who may need to stop multiple vendor building block pipelines.

A management service can be implemented that can address these and other such challenges with certain embodiments. In one embodiment, vendor building block pipelines can be replaced by a vendor management service that will give control to vendors to define their own stages and waves for the individual deployment of the cell containing a group of building blocks. Such a service can leverage a deployment template that contains the definition and configuration of the building blocks in a given cell, and if needed dependencies cross-cell. Once a plan is received, the request can be sent to a service engine in the partition in which the cell was defined, which can perform the bootstrapping work of the accounts and resources for the building blocks defined in that deployment plan. Once all the foundational resources are obtained in the cell, the service engine can acknowledge that occurrence so dependencies can be resolved while the service engine kicks off the actual deployment of the cell infrastructure using the deployment worker available in the region of the cell region. In at least one embodiment, a deployment worker can receive the metadata needed to do the final deployment of the building block, including the accounts, artifact versioning, and building block management.

Once a deployment worker is assigned, it can locate the artifacts related to the deployment and execute the deployment using the cell definition coming all the way from the vendor management service request. This deployment can be performed using either a custom solution using step functions or reusing pipelines deployment groups. After the deployment is completed and successful, the deployment worker can kick off the integration tests and approval workflows to make sure the cell is properly working, and then send an acknowledgement back indicating the success or error to the service engine. The artifacts used by a deployment worker can come from a building block development pipeline, for example, where all the necessary components (e.g., docker images, serverless functions, or a development kit, among others) can be built and waves can be promoted to the different partition and regions following the recommended release plan. A management service can take these artifacts, version them accordingly, and store them for later use by deployment workers (or deployment groups from pipelines, etc.). Once a new version of a building block is released and the artifacts are taken in, a management service can trigger a deployment for that building block, such as by using a deployment coordinator. Such deployment can expand to the scope of the building block stage and/or wave, and can contain all the building block cells that are part of that stage and/or wave. Building block-triggered deployments can contain rules to reduce the blast radius to a minimum while having a reduced release time. These rules can include, for example, cross vendor metrics, stages, types of vendors, and the like.

In at least one embodiment, a vendor management service can allow users to present definitions to perform auto-builds for service instances. Such a service can promote the application code and artifacts to a vendor-specific bucket controlled by the service, and can manage a reference to the artifacts so the service can start the deployment of the application. In some embodiments there will be no vendor building blocks, as a vendor management service can control the deployments for all cells. In this step, a building block pipeline can promote the artifacts to an specific per building block bucket that holds all versions of a building block. The service can then generate a release for all cells using that building block. A vendor can then call the service with operations to be performed on their cells, and the service can control the deployment for vendor configurations by identifying the impacted instances and/or cells. There can then be different promotion paths for building block software deployment and for vendor configuration management.

In at least one embodiment, a fine-grained, per-cell update operation can be used that will allow vendors to orchestrate their own update process which can be directly deployed to specific cells. A management service can call an appropriate workflow that can write the vendor extended configuration to the correct package(s). The status of the deployment can be monitored, and can determine whether deployment was completed successfully.

Such a service can be used to onboard vendors by providing for vendor onboarding self-service. An API call can be issued to trigger generation of the necessary infrastructure to obtain a working vendor, taking as input the necessary configuration for that vendor. Such a process can create the appropriate pipelines and packages, as well as identify the relevant domains and provide the appropriate software hooks and extended functionality. Vendors can then have the ability to define their own deployment structure and test their own cells.

Deployments can be orchestrated in part by leveraging a combination of pipelines with a specified release pattern for a different pool of cells. Building block pipelines can contain different deployment groups that can trigger a deployment for a pre-defined group of cells, such as by using specified sharding properties. As an example, a cell may primarily be composed by cell identifier, region, vendor, stage, building block code, and vendor type. The values can be used to group cells in different pools, and those pools can be attached to a specific deployment stage in a building block pipeline. Using such an approach, fleet deployments can be intuitive in a way that developers still keep the pipeline experience for the bulk of their work but vendor cells are grouped and deployed dynamically. Building blocks may have certain constructs, such as a published step that publishes the necessary artifacts for a building block to work properly, which can be used at the beginning of a pipeline and can call the management service with the version of the artifacts to take into the internal registry. A corresponding release step can be used to define the release properties, as may relate to stage, regions, and the like, where the service should deploy the artifacts previously published.

Figure 6:
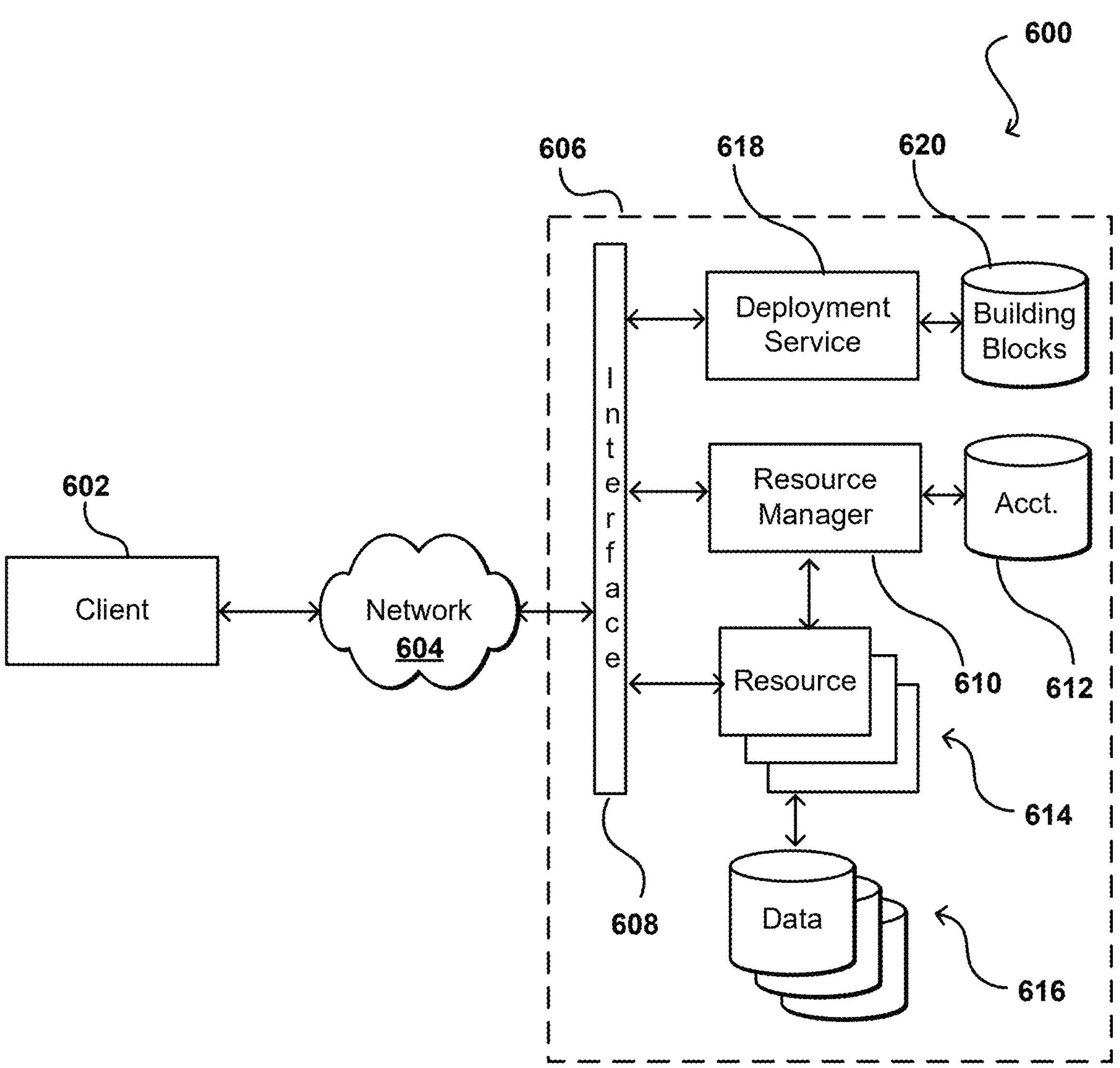
FIG. 6 illustrates an example network-inclusive computing environment in which aspects of various embodiments can be implemented.

FIG. 6 illustrates an example environment 600 in which aspect of various embodiments can be implemented. Such an environment can be used in some embodiments to provide resource capacity for one or more users, or users of a resource provider, as part of a shared or multi-tenant resource environment. For example, the provider environment 606 can be a cloud environment that can be used to provide cloud-based network connectivity for users, as can be used during disaster recovery or network optimization. The resources can also provide networking functionality for one or more client devices 602, such as personal computers, which can be able to connect to one or more network(s) 604, or can be used to perform network optimization tasks as discussed herein.

In this example a user is able to utilize a client device 602 to submit requests across at least one network 604 to a multi-tenant resource provider environment 606. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 604 can include any appropriate network, including an intranet, the Internet, a cellular network, a local area network (LAN), or any other such network or combination, and communication over the network can be enabled via wired and/or wireless connections. The resource provider environment 606 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 606 can include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 614 of one or more types, which may each include at least one CPU and at least one GPU, among other such processing units. These types can include, for example, application servers operable to process instructions provided by a user or database servers operable to process data stored in one or more data stores 616 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 614 can submit a request that is received to an interface layer 608 of the provider environment 606. The interface layer can include application programming interfaces (APIs) or other exposed interfaces enabling a user to submit requests to the provider environment. The interface layer 608 in this example can also include other components as well, such as at least one Web server, routing components, load balancers, and the like. When a request to provision a resource is received to the interface layer 608, information for the request can be directed to a resource manager 610 or other such system, service, or component configured to manage user accounts and information, resource provisioning and usage, and other such aspects. A resource manager 610 receiving the request can perform tasks such as to authenticate an identity of the user submitting the request, as well as to determine whether that user has an existing account with the resource provider, where the account data can be stored in at least one data store 612 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once a user (or other requestor) is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identity, specific address, or other such information that can enable the client device 602 to communicate with an allocated resource without having to communicate with the resource manager 610, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 610 (or another such system or service) in this example can also function as a virtual layer of hardware and software components that handles control functions in addition to management actions, as can include provisioning, scaling, replication, etc. The resource manager can utilize dedicated APIs in the interface layer 608, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 608 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

In at least one embodiment, one or more services may be deployed using a deployment service 618. As mentioned, such a service may use a library 620 of building blocks or templates for respective services, where the building blocks can contain the necessary code and infrastructure definitions, as well as default configuration that can be extended or customized by a vendor or other such party or entity. Vendor-specific services can be programmatically and functionally deployed, allowing for automated communication and interaction, with the vendor not having to worry about low level detail but instead being able to customize the service based on relevant business logic.

Figure 7:
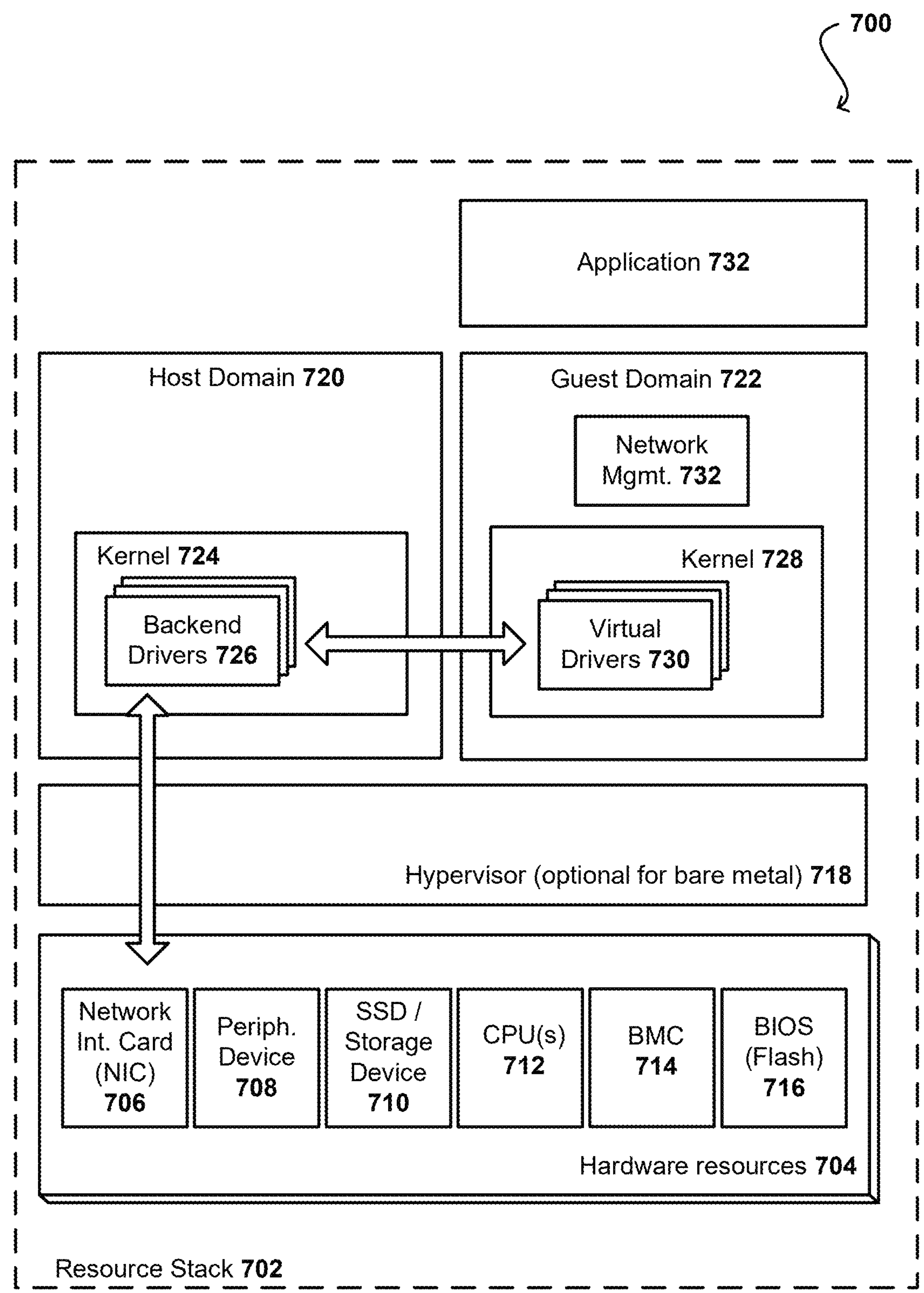
FIG. 7 illustrates example components of a server that can be utilized to perform at least a portion of a network management process, in accordance with various embodiments.

FIG. 7 illustrates an example resource stack 702 of a physical resource 700 that can be utilized in accordance with various embodiments, such as can be provided as part of a provider environment such as that illustrated in FIG. 6. Such a resource can be used as a network router, for example, which can be selected as a waypoint for determining a secondary transmission path or selected as part of a primary transmission path, among other such options. When performing tasks, such as network routing tasks using a routing application 732 or service, for example, such resources can include components such as CPUs 712 for executing code to perform these tasks, NICs 706 for communicating network traffic, and memory for storing instructions and networking data. In some embodiments, an entire machine can be allocated for these tasks, or only a portion of the machine, such as to allocate a portion of the resources as a virtual machine in a guest domain 722 that can perform at least some of these tasks.

Such a resource stack 702 can be used to provide an allocated environment for a user (or user of a resource provider) having an operating system provisioned on the resource. In accordance with the illustrated embodiment, the resource stack 702 includes a number of hardware resources 704, such as one or more central processing units (CPUs) 712; solid state drives (SSDs) or other storage devices 710; a network interface card (NIC) 706, one or more peripheral devices (e.g., a graphics processing unit (GPU), etc.) 708, a BIOS implemented in flash memory 716, and a baseboard management controller (BMC) 714, and the like. In some embodiments, the hardware resources 704 reside on a single computing device (e.g. chassis). In other embodiments, the hardware resources can reside on multiple devices, racks, chassis, and the like. Running on top of the hardware resources 704, a virtual resource stack can include a virtualization layer such as a hypervisor 718 for a Xen-based implementation, a host domain 720, and potentially also one or more guest domains 722 capable of executing at least one application 732. The hypervisor 718, if utilized for a virtualized environment, can manage execution of the one or more guest operating systems and allow multiple instances of different operating systems to share the underlying hardware resources 704. Conventionally, hypervisors are installed on server hardware, with the function of running guest operating systems, where the guest operating systems themselves act as servers.

In accordance with an embodiment, a hypervisor 718 can host a number of domains (e.g., virtual machines), such as the host domain 720 and one or more guest domains 722. In one embodiment, the host domain 720 (e.g., the Dom-0) is the first domain created and helps virtualize hardware resources and manage all of the other domains running on the hypervisor 718. For example, the host domain 720 can manage the creating, destroying, migrating, saving, or restoring the one or more guest domains 722 (e.g., the Dom-U). In accordance with various embodiments, the hypervisor 718 can control access to the hardware resources such as the CPU, input/output (I/O) memory, and hypervisor memory.

A guest domain 722 can include one or more virtualized or para-virtualized drivers 730 and the host domain can include one or more backend device drivers 726. When the operating system (OS) kernel 728 in the guest domain 722 wants to invoke an I/O operation, the virtualized driver 730 can perform the operation by way of communicating with the backend device driver 726 in the host domain 720. When the virtualized driver 730 wants to initiate an I/O operation (e.g., to send out a network packet), a guest kernel component can identify which physical memory buffer contains the packet (or other data) and the virtualized driver 730 can either copy the memory buffer to a temporary storage location in the kernel for performing I/O or obtain a set of pointers to the memory pages that contain the packet(s). In at least one embodiment, these locations or pointers are provided to the backend driver 726 of the host kernel 724 which can obtain access to the data and communicate it directly to the hardware device, such as the NIC 706 for sending the packet over the network.

It should be noted that the resource stack 702 illustrated in FIG. 7 is only one possible example of a set of resources that is capable of providing a virtualized computing environment and that the various embodiments described herein are not necessarily limited to this particular resource stack. In some embodiments, the guest domain 722 can have substantially native or "bare metal" access to the NIC 706 hardware, for example as provided by device assignment technology based on an IO Memory Management Unit (IO-MMU) device mapping solution like Intel VT-D. In such an implementation, there can be no virtualization layer (e.g., Hypervisor) present. The host domain, or OS, can then be provided by the user, with no guest domains utilized. Other technologies, such Single Root IO Virtualization (SR-IOV), can provide similar "bare metal" functionality to guest domains for only certain functionality of the devices. In general, in various other embodiments, the resource stack can comprise different virtualization strategies, hardware devices, operating systems, kernels, domains, drivers, hypervisors and other resources.

In compute servers, a BMC 714 can maintain a list of events that have occurred in the system, referred to herein as a system event log (SEL). In at least one embodiment, the BMC 714 can receive system event logs from the BIOS 716 on the host processor. The BIOS 716 can provide data for system events over an appropriate interface, such as an $I^2C$ interface, to the BMC using an appropriate protocol, such as an SMBus System Interface (SSIF) or KCS interface over LPC. As mentioned, an example of a system event log event from BIOS includes an uncorrectable memory error, indicating a bad RAM stick. In at least some embodiments, system event logs recorded by BMCs on various resources can be used for purposes such as to monitor server health, including triggering manual replacement of parts or instance degrade when SELs from the BIOS indicate failure.

As mentioned, in a virtualized environment the hypervisor 718 can prevent the guest operating system, or guest domain 722, from sending such system event log data to the BMC 714. In the case of bare metal access without such a hypervisor, however, user instances can have the ability to send data for system event that spoof events from the BIOS 716. Such activity could lead to compromised bare metal instances being prematurely degraded due to fake system event data produced by the user OS.

In at least one embodiment, however, there will be portions of the physical resource 700 that will be inaccessible to the user OS. This can include, for example, at least a portion of BIOS 716. BIOS 716 in at least one embodiment is volatile memory such that any data stored to that memory will be lost in the event of a reboot or power down event. The BIOS can keep at least a portion of host memory unmapped, such that it is not discoverable by a host OS. As mentioned, data such as a secret token can be stored to BIOS 716 at boot time, before a user OS is executing on the resource. Once the user OS is executing on the resource, that OS will be prevented from accessing that secret token in BIOS 716. In at least one embodiment, this secret token (or other stored secret) can be provided to the BMC 714 when adding system event log events, whereby the BMC 714 can confirm that the event is being sent by the BIOS 716 and not by the user OS.

Figure 8:
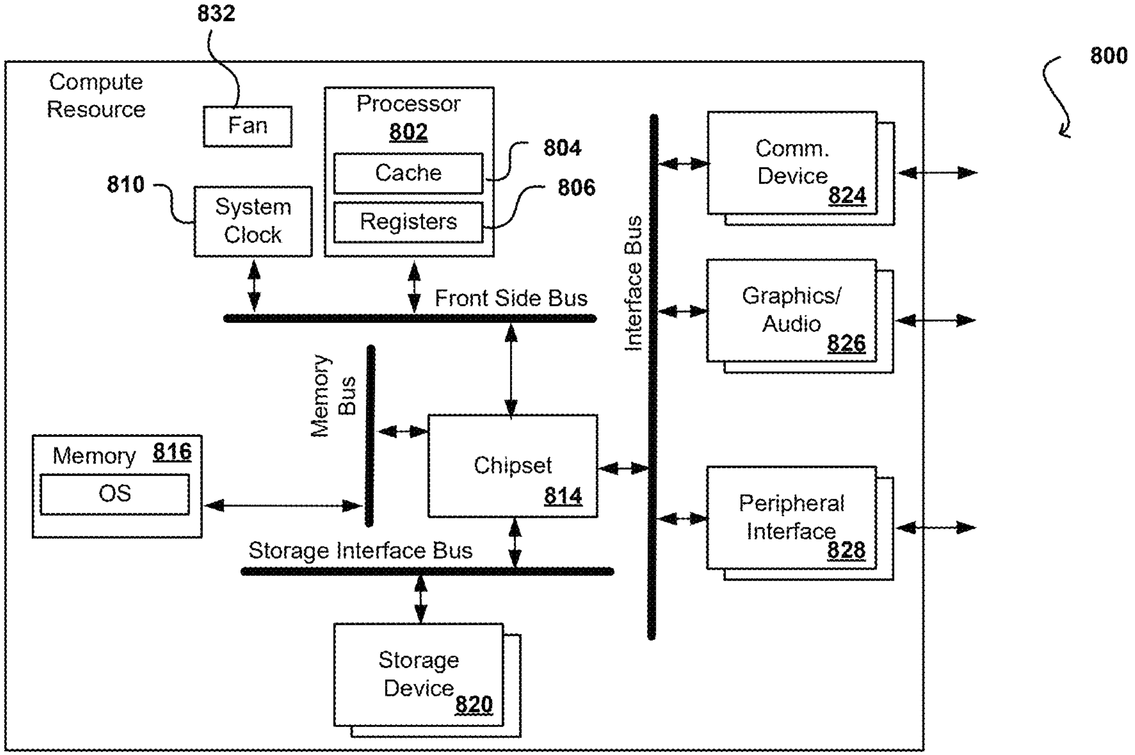
FIG. 8 illustrates example components of a computing device that can be used to implement network monitoring and management aspects of various embodiments.

Computing resources, such as servers, routers, smartphones, or personal computers, will generally include at least a set of standard components configured for general purpose operation, although various proprietary components and configurations can be used as well within the scope of the various embodiments. As mentioned, this can include client devices for transmitting and receiving network communications, or servers for performing tasks such as network analysis and rerouting, among other such options. FIG. 8 illustrates components of an example computing resource 800 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 800 (e.g., a desktop or network server) will have one or more processors 802, such as central processing units (CPUs), graphics processing units (GPUs), and the like, that are electronically and/or communicatively coupled with various components using various buses, traces, and other such mechanisms. A processor 802 can include memory registers 806 and cache memory 804 for holding instructions, data, and the like. In this example, a chipset 814, which can include a northbridge and southbridge in some embodiments, can work with the various system buses to connect the processor 802 to components such as system memory 816, in the form or physical RAM or ROM, which can include the code for the operating system as well as various other instructions and data utilized for operation of the computing device. The computing device can also contain, or communicate with, one or more storage devices 820, such as hard drives, flash drives, optical storage, and the like, for persisting data and instructions similar, or in addition to, those stored in the processor and memory. The processor 802 can also communicate with various other components via the chipset 814 and an interface bus (or graphics bus, etc.), where those components can include communications devices 824 such as cellular modems or network cards, media components 826, such as graphics cards and audio components, and peripheral interfaces 828 for connecting peripheral devices, such as printers, keyboards, and the like. At least one cooling fan 832 or other such temperature regulating or reduction component can also be included as well, which can be driven by the processor or triggered by various other sensors or components on, or remote from, the device. The compute resource 800 can also include at least one system clock 810 that may be referenced by one or more other components. Various other or alternative components and configurations can be utilized as well as known in the art for computing devices.

At least one processor 802 can obtain data from system memory 816, such as a dynamic random access memory (DRAM) module, via a coherency fabric in some embodiments. It should be understood that various architectures can be utilized for such a computing device, which can include varying selections, numbers, and arguments of buses and bridges within the scope of the various embodiments. The data in memory can be managed and accessed by a memory controller, such as a DDR controller, through the coherency fabric. The data can be temporarily stored in a processor cache 804 in at least some embodiments. The computing resource 800 can also support multiple I/O devices using a set of I/O controllers connected via an I/O bus. There can be I/O controllers to support respective types of I/O devices, such as a universal serial bus (USB) device, data storage (e.g., flash or disk storage), a network card, a peripheral component interconnect express (PCIe) card or interface 828, a communication device 824, a graphics or audio card 826, and a direct memory access (DMA) card, among other such options. In some embodiments, components such as the processor, controllers, and caches can be configured on a single card, board, or chip (i.e., a system-on-chip implementation), while in other embodiments at least some of the components can be located in different locations, etc.

An operating system (OS) running on the processor 802 can help to manage the various devices that can be utilized to provide input to be processed. This can include, for example, utilizing relevant device drivers to enable interaction with various I/O devices, where those devices can relate to data storage, device communications, user interfaces, and the like. The various I/O devices will typically connect via various device ports and communicate with the processor and other device components over one or more buses. There can be specific types of buses that provide for communications according to specific protocols, as can include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device can be used, for example, as a server in a server farm or data warehouse. Server computers often have a need to perform tasks outside the environment of the CPU and main memory (i.e., RAM). For example, the server can need to communicate with external entities (e.g., other servers) or process data using an external processor (e.g., a General Purpose Graphical Processing Unit (GPGPU)). In such cases, the CPU can interface with one or more I/O devices. In some cases, these I/O devices can be special-purpose hardware designed to perform a specific role. For example, an Ethernet network interface controller (NIC) can be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device can be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device can be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components can be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) can also be utilized. Additionally, in other embodiments, one or more of the computing device resource components can be virtualized hardware components emulated by the host device. In such embodiments, the I/O adapter device can implement a management process in which a host device is configured with physical or emulated hardware components based on a variety of criteria. The computing device resource components can be in communication with the I/O adapter device via the communication channel. In addition, a communication channel can connect a PCI Express device to a CPU via a northbridge or host bridge, among other such options.

In communication with the I/O adapter device via the communication channel can be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches can be controlled together or independently. For example, the I/O adapter device can selectively close a hardware latch for one or more components based on a trust level associated with a particular user. In another example, the I/O adapter device can selectively close a hardware latch for one or more components based on a trust level associated with an author or distributor of the executable code to be executed by the I/O adapter device. In a further example, the I/O adapter device can selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches can be controlled together or independently.

As discussed, different approaches can be implemented in various environments in accordance with the described embodiments. As will be appreciated, although a network- or Web-based environment is used for purposes of explanation in several examples presented herein, different environments can be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which can be chained or otherwise configured, which can interact to perform tasks such as obtaining data from an appropriate data store. As used herein, the term "data store" refers to any device or combination of devices capable of storing, accessing and retrieving data, which can include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which can be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that can need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) can also be capable of executing programs or scripts in response requests from user devices, such as by executing one or more Web applications that can be implemented as one or more scripts or programs written in any programming language, such as Java®, C, C#or C++ or any scripting language, such as Perl, Python or TCL, as well as combinations thereof. The server(s) can also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers can include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system can also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments can have numerous variations from that described above. For example, customized hardware might also be used and/or particular elements might be implemented in hardware, software (including portable software, such as applets) or both. Further, connection to other computing devices such as network input/output devices can be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes can be made thereunto without departing from the broader spirit and scope of the invention as set forth in the claims.

What is claimed is:

1. A computer-implemented method, comprising:

providing a library of building blocks, an individual building block of the library including code, infrastructure definition, and default configuration for enabling a service to perform at least one task;

receiving, on behalf of a vendor, a request to build and deploy a specified service in a multi-tenant environment;

providing, in response to the request, an identified building block from the library, the identified building block corresponding to the specified service;

enabling the default configuration to be modified, on behalf of the vendor, to generate an extended vendor configuration, the extended vendor configuration including information specific to usage by the vendor for the specified service to be deployed;

automatically packaging the extended vendor configuration with the code and infrastructure definition to generate a customized service package; and deploying, using the customized service package, one or more instances of the specified service in the multi-tenant environment and associated with the vendor, wherein the one or more instances are automatically able to interact to perform specified functionality using available resources of the multi-tenant environment based at least in part on the customized service package.

2. The computer-implemented method of claim 1, wherein the deploying of the one or more instances comprises a programmatic functional deployment of a set of related services to perform one or more tasks with respect to a vendor application.

3. The computer-implemented method of claim 1, wherein the identified building block includes the code and infrastructure definition to provide for automatically managing at least one of permissions, communications, security, or request routing among the one or more instances.

4. The computer-implemented method of claim 1, wherein the extended vendor configuration for the identified building block is stored separately from the code and infrastructure definition for the identified building block, and wherein the extended vendor configuration for the identified building block is merged with the code and infrastructure definition for the identified building block prior to the deploying.

5. The computer-implemented method of claim 1, wherein the code or the infrastructure definition is able to be updated from a single storage location before the deploying and then merged with the extended vendor configuration for multiple vendors in order to deploy updated instances of the specified service without need to process the updated instances using a plurality of vendor-specific pipelines.

6. A computer-implemented method, comprising:

providing a set of building blocks, individual building blocks of the set including code and infrastructure definitions for enabling respective services;

providing, from the set, an identified building block for enabling a specific service, the specific service being requested to be deployed;

receiving extended configuration, specific to at least one instance of the specific service requested to be deployed, to be automatically incorporated with the identified building block for the deployment of the at least one instance of the service; and performing a programmatic functional deployment of the at least one instance of the service using the code and the infrastructure definition, from the identified building block, with the extended configuration, wherein communications and interactions between the at least one instance and one or more other services is automatically facilitated through the programmatic functional deployment based at least in part on the extended configuration.

7. The computer-implemented method of claim 6, wherein the extended configuration of the identified building block is stored separately from a single instance of the code and infrastructure definition of the identified building block, or each version of the extended configuration of the identified building block is stored together with the code and infrastructure definition of the identified building block in a separate package.

8. The computer-implemented method of claim 6, wherein the specific service to be deployed is requested on behalf of a vendor and associated with a vendor application hosted in a multi-tenant resource environment.

9. The computer-implemented method of claim 8, wherein the identified building block allows single-tenant functionality to be deployed and automatically configured in the multi-tenant resource environment.

10. The computer-implemented method of claim 6, wherein the service is a control plane service or a single-task microservice to perform the single task on behalf of a control plane service.

11. The computer-implemented method of claim 6, wherein the building blocks correspond to service templates including the code, infrastructure, and default configuration to deploy and execute respective services without manual human intervention.

12. The computer-implemented method of claim 6, wherein the method is performed using one or more pipelines, and further comprising:

providing one or more software hooks at specific locations in the one or more pipelines in order to allow for extension of pipeline functionality.

13. The computer-implemented method of claim 6, wherein the at least one instance includes multiple instances to be deployed in different geographic regions or different service cells.

14. The computer-implemented method of claim 6, further comprising:

merging the code and infrastructure definition with the extended configuration for the identified service into a package to be used for the performing the programmatic functional deployment.

15. The computer-implemented method of claim 6, wherein the set of building blocks are provided through a building block marketplace and created by one or more building block teams.

16. A system, comprising:

one or more processors; and one or more memory devices including instructions that, when executed by the one or more processors, cause the one or more processors to:

provide a set of building blocks, individual building blocks of the set including code and infrastructure definitions for enabling respective types of services;

provide, from the set, an identified building block for enabling a type of service, the specific service being requested to be deployed;

receive extended configuration specific to at least one instance of the type of service requested to be deployed, to be automatically incorporated with the identified building block for the deployment of the at least one instance of the service; and perform a programmatic functional deployment of the at least one instance of the type of service using the code and the infrastructure definition, from the identified building block, with the extended configuration, wherein communications and interactions between the at least one instance and one or more other services is automatically facilitated through the programmatic functional deployment based at least in part on the extended configuration.

17. The system of claim 16, wherein the extended configuration of the identified building block is stored separately from a single instance of the code and infrastructure definition of the identified building block, or each version of the extended configuration of the identified building block is stored together with the code and infrastructure definition of the identified building block in a separate package.

18. The system of claim 16, wherein the type of service to be deployed is requested on behalf of a vendor and associated with a vendor application hosted in a multi-tenant resource environment.

19. The system of claim 16, wherein the type of service is a control plane service or a single-task microservice to perform the single task on behalf of a control plane service.

20. The system of claim 16, wherein the building blocks correspond to service templates including the code, infrastructure, and default configuration for use to deploy and execute respective services without manual human intervention.

* * * * *